United States Patent
Fukazawa

(10) Patent No.: US 12,281,037 B2
(45) Date of Patent: Apr. 22, 2025

(54) FIBER AND MANUFACTURING METHOD OF THE SAME

(71) Applicant: Nippon Fiber Corporation, Chiba (JP)

(72) Inventor: Hiroshi Fukazawa, Abiko (JP)

(73) Assignee: NIPPON FIBER CORPORATION, Abiko (JP)

( * ) Notice: Subject to any disclaimer, the term of this patent is extended or adjusted under 35 U.S.C. 154(b) by 336 days.

(21) Appl. No.: 17/951,186

(22) Filed: Sep. 23, 2022

(65) Prior Publication Data

US 2023/0023966 A1 Jan. 26, 2023

Related U.S. Application Data

(63) Continuation of application No. PCT/JP2021/011047, filed on Mar. 18, 2021.

(30) Foreign Application Priority Data

Mar. 24, 2020 (JP) ................. 2020-052418

(51) Int. Cl.
| | |
|---|---|
| C03B 37/02 | (2006.01) |
| C03B 37/01 | (2006.01) |
| C03B 37/075 | (2006.01) |
| C03C 1/00 | (2006.01) |
| C03C 3/087 | (2006.01) |
| C03C 13/06 | (2006.01) |

(52) U.S. Cl.
CPC ............. *C03B 37/02* (2013.01); *C03B 37/01* (2013.01); *C03B 37/075* (2013.01); *C03C 1/002* (2013.01); *C03C 3/087* (2013.01); *C03C 13/06* (2013.01); *C03B 2203/02* (2013.01)

(58) Field of Classification Search
None
See application file for complete search history.

(56) References Cited

U.S. PATENT DOCUMENTS

2022/0177350 A1 6/2022 Fukazawa

FOREIGN PATENT DOCUMENTS

| CN | 107459255 A | * 12/2017 |
|---|---|---|
| CN | 108203246 A | * 6/2018 |
| JP | 6-316815 A | 11/1994 |
| JP | 2006-124253 A | 5/2006 |
| JP | 2008-266038 A | 11/2008 |

(Continued)

OTHER PUBLICATIONS

KR20190072399A EPO Machine Translation Retrieved Nov. 24, 2024. (Year: 2024).*

(Continued)

*Primary Examiner* — Lisa L Herring
(74) *Attorney, Agent, or Firm* — Birch, Stewart, Kolasch & Birch, LLP

(57) ABSTRACT

A fiber and a fiber manufacturing method are provided, in which an integrated coal gasification combined cycle (IGCC) slag constitute a component of raw materials of the fiber. The fiber can be fabricated stably from the melt of the raw materials by the method in which the raw materials are preheated up to 1300° C. or higher; the raw materials are maintained at the same temperature for certain period of time; subsequently, the temperature of the raw materials are raised further to cause the melted materials are spun into fiber.

5 Claims, 3 Drawing Sheets

(56) References Cited

FOREIGN PATENT DOCUMENTS

| JP | 4360469 B2 | * | 11/2009 |
| JP | 2017-14052 A | | 1/2017 |
| KR | 20190072399 A | * | 6/2019 |
| WO | WO2020/218356 A1 | | 10/2020 |

OTHER PUBLICATIONS

CN-107459255-A Clarivate Analytics Machine Translation retrieved Nov. 26, 2024. (Year: 2024).*
CN-108203246-A Clarivate Analytics Machine Translation retrieved Nov. 26, 2024. (Year: 2024).*
JP-4360469-B2 Clarivate Analytics Machine Translation retrieved Nov. 26, 2024. (Year: 2024).*
Martin et al., "Recycling of residual IGCC slags and their benefits as degreasers in ceramics", J. of Environmental Management 129, Jun. 2013, pp. 1-8. (Year: 2013).*
International Search Report (PCT/ISA/210), issued in PCT/JP2021/011047, dated Jun. 1, 2021.
Written Opinion of the International Searching Authority (PCT/ISA/237), issued in PCT/JP2021/011047, dated Jun. 1, 2021.

* cited by examiner

[Fig. 1]

[Fig. 3]
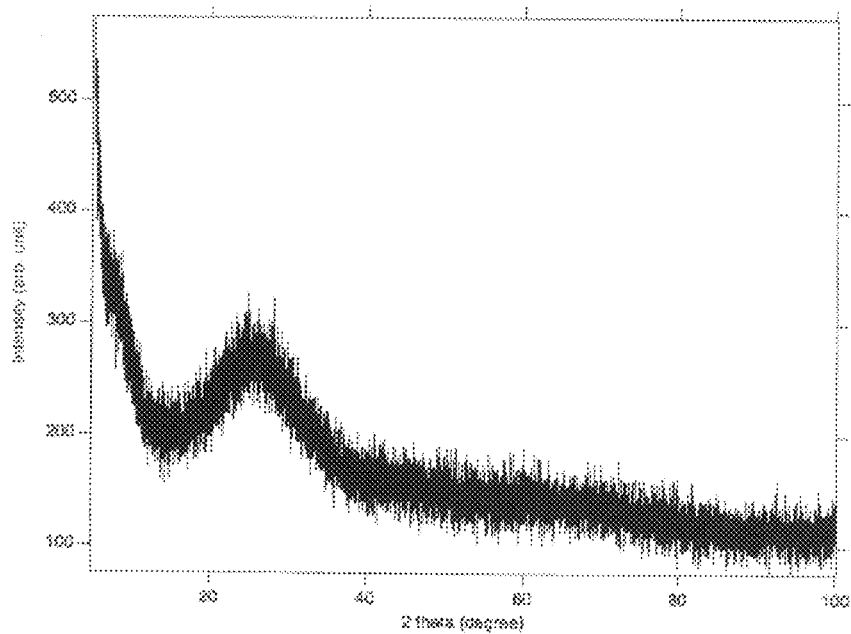
[Fig. 4]
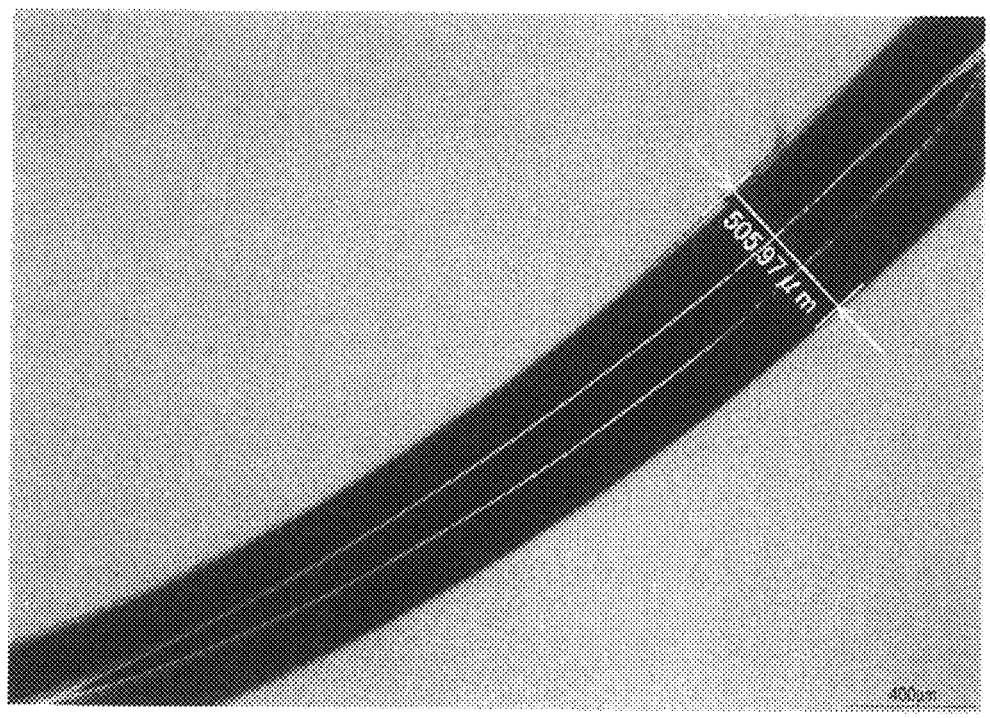

FIBER AND MANUFACTURING METHOD OF THE SAME

CROSS-REFERENCE TO RELATED APPLICATIONS

This application is a Continuation application of PCT International Application No. PCT/JP2021/011047, filed on Mar. 18, 2021, which claims priority under 35 U.S.C. § 119(a) to Patent Application No. 2020-052418, filed in Japan on Mar. 24, 2020, all of which are hereby expressly incorporated by reference into the present application.

FIELD OF THE INVENTION

The present invention relates to a fiber and a fiber manufacturing method. More particularly, the present invention relates to a fiber and a fiber manufacturing method wherein the main raw material of the fiber is IGCC slag.

BACKGROUND OF THE INVENTION

Integrated coal Gasification Combined Cycle (IGCC) has been developing as one of the best future processes that can generate power with higher thermal efficiency than conventional coal-fired power generation. In IGCC, coal gasification gas is used as fuel to drive a gas turbine to obtain electric power, while at the same time, exhaust heat from the gas turbine is recovered to generate steam, and the generated steam is used to drive a steam turbine to obtain electric power.

IGCC power generation can achieve a high thermal efficiency which has not attained yet by the conventional coal power generation. Specifically, in the case of a commercial IGCC of 1400° C. to 1500° C. class, a thermal efficiency of about 48% to 50% has already been realized. Furthermore, IGCC power generation allows the use of lower quality coal, thus reducing fuel costs and diversifying coal sources.

As described above, IGCC is expected as a highly efficient process for next-generation power plant. However, in terms of effective utilization of the waste, it was not satisfactory. That is, most of the slag generated from IGCC power plant (referred to "IGCC slag", hereinafter), has been used so far only as the aggregate for cement or asphalt paving mixture (See JP 2017-014052 A).

Incidentally, it has been recognized that it was extremely difficult to produce fibers using IGCC slag as a raw material, whereas glass fibers have long history of manufacture of commercial scale.

Accordingly there is a need to develop a more efficient and stable manufacturing method of fibers using IGCC slag. It is an object of the invention to provide a fiber and a fiber manufacturing method, in which IGCC slag is utilized more effectively.

SUMMARY

The inventive aspects and embodiments discussed below in the following separate paragraphs of the summary may be used independently or in combination with each other.

In one aspect, a fiber using IGCC slag as a raw material is provided. In certain embodiment, the raw material can be a mixture of IGCC slag with other materials provided IGCC slag is a major component in the mixture. In preferred embodiment, the mass ratio in total mass of the raw materials is equal to or more than 0.5.

In other aspect, a method for producing fibers is provided. The method includes a first step of preheating the raw material to a temperature of 1300° C. or higher for a predetermined period of time, and a second step of raising the temperature thereafter to a temperature higher than the preheating temperature.

BRIEF DESCRIPTION OF DRAWINGS

FIG. 3 is an XRD spectrum of a fiber of Example A1;

FIG. 4 is an enlarged view (micrograph) of the fiber of Example A1;

DETAILED DESCRIPTION

Figure 1:
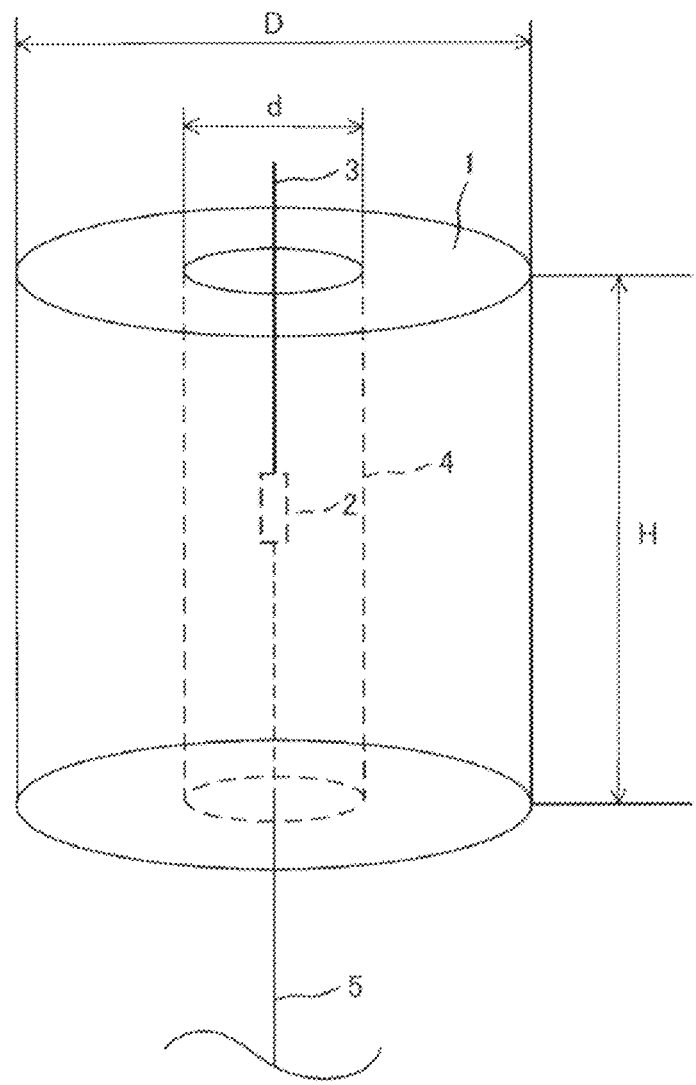
FIG. 1 is a diagram illustrating an outline of the apparatus utilized in the embodiments or example.

In the following embodiments, an apparatus composed of an electric furnace was used to evaluate the melt-spinnability of the raw material into a fiber. The outline of the apparatus is shown in FIG. 1. In FIG. 1 the electric furnace (1) is of a cylindrical body having a height H of 60 cm and an outer diameter D of 50 cm, in which a through-hole (4) having an inner diameter d of 10 cm is formed at the center. A Tammann tube (2) having an inner diameter of 2.1 cm and a length of 10 cm is suspended by a suspension rod (3) in the through-hole (4). The Tammann tube (2) is charged with 30 g of the raw material. A hole (6) (not described in the figure) having a diameter of 2 mm is provided at the center of the bottom part of the Tammann tube (2), and when the blend of the raw materials is melted by heating, the molten material flows out through the hole (6) by gravity. The molten material that has flowed out is exposed to external air to be cooled and is solidified into a fiber.

In the electric furnace (1), temperature is raised according to a predetermined temperature raising program, and it has been confirmed in advance that the temperature of the molten material in the Tammann tube (2) follows the temperature profile inside the furnace at a temperature approximately lower by 50° C.

Melt spinnability will be evaluated and rated as follows.
A: The melt of the raw material comes out of the hole (6) forming a long fiber continuously and in a stable manner.
B: The melt of the raw material comes out of the hole (6) forming fibers in an unstable manner, thus only very short fibers are generated; a long fiber is not formed.
C: Nothing comes out through the hole (6), and no fiber is formed.
D: The melt of the raw material comes out of the hole (6) as a droplet and no fiber is formed.

Here, since the molten material that has flowed out is rapidly cooled, the fiber in preferred embodiment is of substantially amorphous phase.

The degree of amorphousness, which is a measure of amorphousness, is calculated by the following Mathematical Formula (1) based on an X-ray diffraction (XRD) spectrum.

$$\text{Degree of amorphousness } (\%) = [Ia/(Ia+Ic)] \times 100 \qquad (1)$$

In the above Formula (1), Ia and Ic are respectively as follows.
  Ia: integrated value of the scattering intensity of the amorphous halo.

Ic: integrated value of the scattering intensity of a crystalline peak when the fiber is subjected to X-ray diffraction analysis.

The degree of amorphousness of the fiber according to the present Embodiments may vary depending on the composition of the fiber; however, the degree of amorphousness usually presents a value of 90% or higher. The degree of amorphousness of the fiber even reaches as high as 95% or higher in some cases, and in case where the degree of amorphousness is the highest, the fiber is substantially composed only of an amorphous phase. Here, being substantially composed only of an amorphous phase implies that only the amorphous halo is recognized in the X-ray diffraction spectrum, and a peak for a crystalline material is not recognized.

Incidentally, in the following description of the embodiments, $SiO_2$ may be referred to as component S, and the content of $SiO_2$ may be described as [S].

$Al_2O_3$ may be referred to as component A, and the content of $Al_2O_3$ may be described as [A].

CaO may be referred to as component C, and the content of CaO may be described as [C].

In the following Embodiments, there is no substantial difference between the component ratio (mass ratio) of the raw materials and the component ratio (mass ratio) of the fiber manufactured by melting the raw materials. Accordingly, the component ratio of the raw materials can be regarded as the component ratio of the fiber manufactured by melting the raw materials.

The fiber according to the Embodiment uses an IGCC slag or the mixture of IGCC slag with other secondary materials such as copper slag, fly ash or basalt or others. The IGCC slag contains $SiO_2$ and $Al_2O_3$ as main components, the proportion occupied by $Al_2O_3$ in the sum of $SiO_2$ and $Al_2O_3$ is in a specific range, and the IGCC slag further contains a specific amount of CaO.

The total content of $SiO_2$ and $Al_2O_3$ in the IGCC slag (or the mixture of the IGCC slag with other materials) is preferably 40% by mass or more and 70% by mass or less. When the sum of [S] and [A] is either less than 40% by mass or more than 70% by mass, the melting temperature of the IGCC slag or its mixture of above as the raw material becomes high or the viscosity of the molten material becomes high, which results in inferior melt spinnability. Incidentally, melt spinning refers to a technique of discharging a molten material obtained by melting a raw material by heat through a hole (through-hole) formed in a spinneret to produce a fibrous form and then cooling and hardening the fibrous form. Furthermore, melt spinnability refers to the ease of manufacturing of a fiber by melt spinning.

It is preferable that the proportion occupied by $Al_2O_3$ in the sum of $SiO_2$ and $Al_2O_3$ ([A]/([A]+[S])) (mass ratio) is in the range of 0.15 to 0.40. When [A]/([A]+[S]) is either less than 0.15 or more than 0.40, the melt temperature becomes high or the viscosity of the molten material becomes high, which results in inferior melt spinnability.

Further, the content of CaO in the IGCC slag (or the mixture of IGCC slag with other materials) is preferably 5% by mass or more and 30% by mass or less. When the content of Cao is less than 5% by mass, the melting temperature of the fiber becomes high, and therefore, it is not preferable from the viewpoint of energy saving. Furthermore, the content of CaO is more preferably 30% by mass or less.

It should be noted that the fiber according to the present Embodiment is not precluded from including unavoidable impurities. Examples of main unavoidable impurities include MgO, $Na_2O$, $K_2O$, $TiO_2$, and $CrO_2$.

Most of the fiber formed in the embodiment is highly amorphous. For this reason, the fiber has almost no decrease in strength caused by separation at the crystalline phase/amorphous phase interface, and a fiber having high strength can be obtained.

Embodiment 1

Embodiment 1 will be described below with examples and comparative examples.

In embodiment 1, it is attempted to manufacture a fiber using IGCC slag as the only raw material. Sample of an IGCC slag was arranged from a domestic IGCC power plant. Hereinafter, this sample is referred to as "raw material S1" or simply "S1".

The components of the raw material S1, analyzed by a fluorescent X-ray analysis method, were $Fe_2O_3$ 9.05, $SiO_2$ 53.6, $Al_2O_3$ 14.53, CaO 17.24, and others 5.58 (mass %).

Example A1

The raw material S1 was placed in the Tammann tube (2). Next, the temperature inside the furnace was raised to 1350° C. (the temperature of the raw material S1 was 1300° C.), and then the raw material S1 was maintained at approximately 1350° C. for a predetermined time of 55 minutes. Subsequently, spinnability was checked while elevating the temperature inside the furnace, and the melted raw material S1 came out of the hole (6) forming a fiber (Melt spinnability rated: A). Here, it should be noted out that both i) temperature holding step and ii) temperature elevating step after step i) were included during the test in Example A1. Table 1(a) summarizes temperature profile adopted during the test in Example A1.

TABLE 1(a)

| Example A1 | |
|---|---|
| Time (min) | Temperature inside furnace (° C.) |
| 0 | 25 |
| 60 | 1350 |
| 100 | 1350 |
| 115 | 1400 |
| 135 | 1400 |
| 150 | 1450 |
| 154 | 1450 |

FIG. 3 is an XRD spectrum of a fiber obtained in Example A1; formed from the raw material S1. As seen in FIG. 3, only the amorphous halo was recognized in the X-ray diffraction (XRD) spectrum of the fiber obtained in the Example A1, and a peak for a crystalline material was not recognized. From this, it was understood that the fiber produced from the IGCC slag was substantially composed only of an amorphous phase.

Example A2

The raw material S1 was placed in the Tammann tube (2). Next, the temperature inside the furnace was raised to 1375° C. (the temperature of the raw material S1 was 1325° C.), and then the raw material S1 was maintained at approximately 1375° C. for a predetermined time of (120 minutes). Subsequently, spinnability was checked while changing the temperature inside the furnace, and the melted raw material S1 formed a fiber (melt spinnability: A). Here again, it should be noted out that both i) temperature holding step and ii) temperature elevating step after step i) were included during the test in Example A2. Table 1(b) summarizes the changes in the temperature (or temperature profile) inside the furnace during the test in Example A2.

TABLE 1(b)

| Example A2 | |
|---|---|
| Time (min) | Temperature inside furnace (° C.) |
| 0 | 25 |
| 60 | 1375 |
| 150 | 1375 |
| 180 | 1380 |
| 191 | 1380 |

Comparative Example E1

The raw material S1 was placed in the Tammann tube (2), subsequently the temperature inside the furnace was raised to 1350° C. (the temperature of the raw material S1 was 1300° C.), and then the raw material S1 was maintained at approximately 1350° C. for a predetermined time (94 minutes). Subsequently, spinnability was checked without changing the temperature inside the furnace; however, the raw material S1 did not come out of hole (6), and fibers were not formed. The melt spinnability was rated C. In comparison to Example 1 or 2, Comparative Example E1 lacks the ii) temperature elevating step.

Table 1(c) summarizes the changes in the temperature (or temperature profile) inside the furnace during the test in Comparative example E1.

TABLE 1(c)

| Comparative example E1 | |
|---|---|
| Time (min) | Temperature inside furnace (° C.) |
| 0 | 25 |
| 60 | 1350 |
| 154 | 1350 |

Comparative Example E2

The raw material S1 was placed in the Tammann (2) tube, subsequently the temperature inside the furnace was raised to 1400° C. (the temperature of the raw material S1 was 1350° C.). Here, after the temperature was raised to 1400° C., temperature retention of maintaining the temperature for a predetermined time was not carried out, thus Comparative Example E2 lacks the i) temperature holding step. Spinnability was checked while changing the temperature inside the furnace. However, the raw material that had been melted and softened came out through the hole (6) of the Tammann tube (2) only as droplets and the fibers were not formed. The melt spinnability was rated D. Table 1(d) summarizes the changes in the temperature (or temperature profile) inside the furnace during the test in Comparative example E2.

TABLE 1(d)

| Comparative example E2 | |
|---|---|
| Time (min) | Temperature inside furnace (° C.) |
| 0 | 25 |
| 60 | 1400 |
| 75 | 1417 |
| 90 | 1422 |
| 105 | 1422 |

Comparative Example E3

The raw material S1 was placed in the Tammann tube (2), subsequently the temperature inside the furnace was raised to 1320° C. (the temperature of the raw material S1 was 1270° C.), and then the raw material S1 was maintained at approximately 1320° C. for a predetermined time (20 minutes). Subsequently, it was checked whether the raw material S1 was spun without changing the temperature inside the furnace; however, the raw material S1 did not come out of the hole (6), and fibers were not formed. The melt spinnability was rated C. Table 1(e) summarizes the changes in the temperature (or temperature profile) inside the furnace during the test in Comparative example E3.

TABLE 1(e)

| Comparative example E3 | |
|---|---|
| Time (min) | Temperature inside furnace (° C.) |
| 0 | 25 |
| 100 | 1320 |
| 120 | 1320 |

Figure 2:
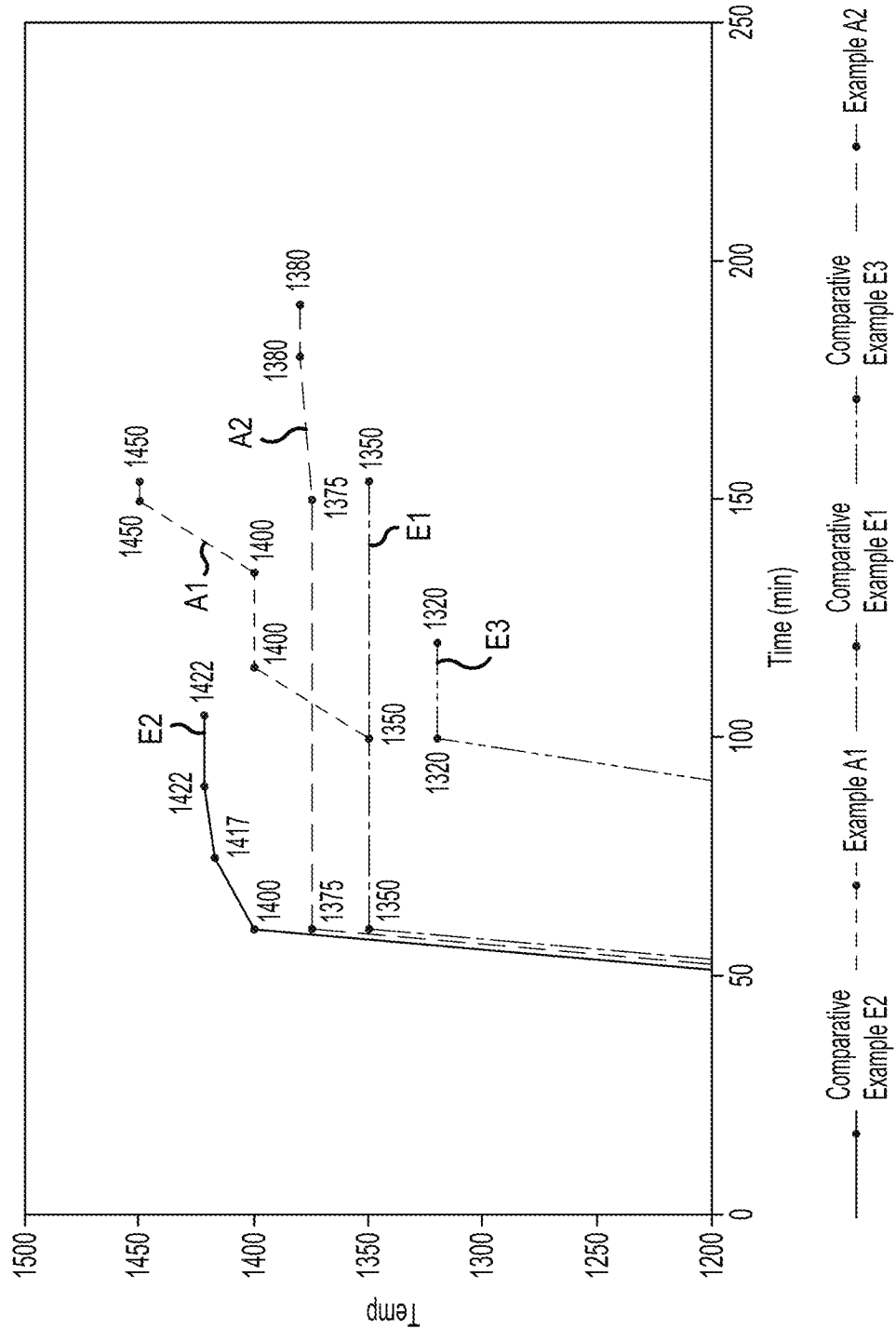
FIG. 2 is a graph showing the temperature profile adopted in Example or Comparative example of embodiment 1.

FIG. 2 is a graph obtained by plotting the changes over time in the temperature (temperature profile) inside the furnace in Examples A1 and A2 and Comparative Examples E1 to E3.

From Examples A1 and A2 and Comparative Examples E1 to E3, it was found that a fiber can be manufactured by using an IGCC slag as a raw material.

Regarding the conditions in the case of manufacturing a fiber by using an IGCC slag as a raw material, it was verified that the method to follow the steps below are preferable.

That is, the preferred method comprises the steps of:
1) heating a raw material up to 1300° C. or higher;
2) subsequently, maintaining above temperature of the raw material for a predetermined time; and
3) subsequently, raising the temperature of the raw material further to flow out through a forming hole thereby forming the raw material in the form of fiber.

Furthermore, FIG. 4 is an enlarged view (micrograph) of the fiber obtained in Example A1. As shown in FIG. 4, a fiber having an outer diameter of more than 500 μm was be obtained. This fiber is substantially composed only of an amorphous phase as shown in FIG. 3. This is speculated to be because, after the IGCC slag in a molten state has flowed out through the hole (6) of the Tammann tube (2), the melt of the IGCC slag is quenched and then becomes amorphous without any regular atomic arrangement. Thus, in this Example 1, it was recognized that a fiber having an outer diameter of more than 500 μm is substantially composed of an amorphous phase. Here, generally, it is conceived that as the outer diameter of the fiber is finer, the rate of cooling is faster. Therefore, it is presumed that as the outer diameter is finer than the outer diameter (505.97 μm) of the fiber shown in FIG. 4, the fiber is substantially composed only of an amorphous phase. More specifically, it is presumed that a fiber having an outer diameter of 500 μm or less is substantially composed only of an amorphous phase.

Embodiment 2

Embodiment 2 will be described below with examples. In embodiment 2, a fiber is disclosed made from IGCC slag as a raw material together with secondary raw materials. The secondary materials may include basalt, fly ash, and refining waste such as copper slag, blast furnace slag. In the following example, samples of raw materials (S2 to S4) are prepared as a mixture of IGCC slag (S1) with copper slag (CS). The components of CS was analyzed by a fluorescent X-ray analysis method. Table 3 summarize the results together with the component of S1.

TABLE 3

(Unit: mass %)

| Item detail | S1<br>IGCC slag | CS<br>Copper slag |
|---|---|---|
| $Fe_2O_3$ [F] | 9 | 55 |
| $SiO_2$ [S] | 54 | 35 |
| $Al_2O_3$ [A] | 11 | 5 |
| CaO [C] | 17 | 2 |
| Others | 9 | 3 |

The mixing ratio of S1 and CS in preparing samples S2 to S4 were summarize in table 4.

TABLE 4

(Unit: mass %)

| Raw material | S2 | S3 | S4 |
|---|---|---|---|
| S1 | 50 | 75 | 90 |
| CS | 50 | 25 | 10 |

Here, the mass ratio of S1 (IGCC slag) in total mass of the raw materials is 0.5 in S2, 0.75 in S3, and 0.90 in S4.

Based on the values of Table 3 and Table 4, the composition of S2 to S4 were calculated. Table 5 summarize the result together with the value of [S]+[A] (total amount of $SiO_2$ and $Al_2O_3$ in each sample) and the value of $Al_2O_3$ in the sum of $SiO_2$ and $Al_2O_3$ ([A]/([A]+[S])) (mass ratio).

TABLE 5

| | S2 | S3 | S4 |
|---|---|---|---|
| $Fe_2O_3$ [F] | 32 | 21 | 14 |
| $SiO_2$ [S] | 45 | 49 | 52 |
| $Al_2O_3$ [A] | 8 | 10 | 10 |
| CaO [C] | 10 | 13 | 16 |
| Others | 6 | 8 | 8 |
| [S] + [A] | 53 | 59 | 63 |
| [A]/([S] + [A]) | 0.15 | 0.16 | 0.17 |

Example A3

The raw material S2 was placed in the Tammann tube (2). Next, the temperature inside the furnace was raised from room temperature (25° C.) to about 1375° C. (raw material temperature 1325° C.), and then the raw material S2 was maintained at about 1375° C. for one hour. Subsequently, while the temperature inside the furnace was raised from about 1375° C. (raw material temperature 1325° C.) to about 1450° C. (raw material temperature 1400° C.) for 15 hours, the molten material was caused to flow out through the hole (6) by gravity forming a fiber continuously in a stable manner. Melt spinnability was rated A. Furthermore, the XRD spectrum of the fiber obtained from the raw material S2 was examined, and peaks for a crystalline material were recognized (peaks for crystalline material present).

Example A4

The raw material S3 was placed in the Tammann tube (2). Next, the temperature inside the furnace was raised from room temperature (25° C.) to about 1375° C. (raw material temperature 1325° C.), and then the raw material S3 was maintained at about 1375° C. for one hour. Subsequently, while the temperature inside the furnace was raised from about 1375° C. (raw material temperature 1325° C.) to about 1450° C. (raw material temperature 1400° C.) for 15 hours gradually, the molten material was caused to flow out through the hole (6). The molten material came out of the hole (6) forming a fiber continuously in stable manner. The melt spinnability was rated A. Furthermore, the XRD spectrum of the fiber obtained was examined, and only the amorphous halo was recognized in the X-ray diffraction (XRD) spectrum of the fiber, so that no peak for a crystalline material was recognized.

Example A5

The raw material S4 was placed in the Tammann tube (2). Next, the temperature inside the furnace was raised from room temperature (25° C.) to about 1375° C. (raw material temperature 1325° C.), and then the raw material S4 was maintained at about 1375° C. for one hour. Subsequently, while the temperature inside the furnace was raised from about 1375° C. (raw material temperature 1325° C.) to about 1400° C. (raw material temperature 1350° C.) for 8 hours, the molten material was caused to flow out through the hole (6) forming a fiber continuously in a stable manner. The melt spinnability was rated A. Furthermore, the XRD spectrum of the fiber obtained from the raw material S4 was examined, and only the amorphous halo was recognized in the X-ray diffraction (XRD) spectrum of the fiber, so that no peak for a crystalline material was recognized.

As seen from Example A3 to A5, the fibers comprising of IGCC slag as main raw materials together with other waste materials such as copper slag were formed continuously in a stable manner.

A fiber obtained from a raw material including an IGCC slag can be processed into roving, chopped strands, woven fabrics, nonwoven fabrics, and the like and used as coating materials or reinforcing materials.

What is claimed is:

1. A fiber manufacturing method, comprising the steps of:
   I) heating a raw material at a temperature between 1300° C. and 1325° C.;
   II) maintaining the temperature of the raw material at the step (I) for a period between 50 and 120 minutes; and
   III) causing the raw material after the step (II) to flow out through a forming hole to form a fiber while increasing the temperature of the raw material up to 1400° C., wherein the raw material comprises:

a) 50 to 100% by mass of waste from an integrated coal gasification combined cycle (IGCC); and
b) 0 to 50% by mass of copper slag, wherein as to the raw material,
i) the total content of $SiO_2$ and $Al_2O_3$ is 40% by mass or more and 70% by mass or less,
ii) a mass ratio of $Al_2O_3/(SiO_2+Al_2O_3)$ is within a range of 0.15 to 0.40, and
iii) content of CaO is between 10 and 30% by mass.

2. The fiber manufacturing method according to claim 1, wherein the raw material further includes fly ash or basalt.

3. The fiber manufacturing method according to claim 1, the mass ratio of the waste from an integrated coal gasification combined cycle (IGCC) in the raw material is 75% by mass or more.

4. The fiber manufacturing method according to claim 1, wherein the fiber is substantially composed only of an amorphous phase.

5. The fiber manufacturing method according to claim 1, wherein an outer diameter of the fiber is 500 μm or less.

\* \* \* \* \*